United States Patent Office 3,344,075
Patented Sept. 26, 1967

3,344,075
FOAM INHIBITION
William P. Scott, Ponca City, Okla., assignor to Continental Oil Company, Ponca City, Okla., a corporation of Delaware
No Drawing. Filed June 22, 1962, Ser. No. 204,607
18 Claims. (Cl. 252—75)

This invention relates as indicated to a composition and method for inhibiting foam in glycol base compositions. More particularly, but not by way of limitation, the present invention relates to a new material for suppressing the foaming tendencies of glycol base freezing point depressants and hydraulic fluids, and to the method of preparation of foam inhibited glycol base anti-freeze formulations and related compositions.

Since World War II, the employment of glycol base anti-freeze in the cooling systems of internal combustion engines has steadily increased until today well over 50% of all anti-freeze produced relies upon the inclusion of glycolic material as the primary freezing point depressant of the product marketed. Glycol base formulations are also widely used as industrial coolants and anti-freezes (in other environments than the cooling system of internal combustion engines) and as hydraulic fluids. Although ethylene glycol remains the most important single type of glycol used in such applications, other types of glycol such as propylene glycol and diethylene glycol are today also widely used, either individually or in mixtures of such glycols.

In most of the above-described applications of glycol base formulations, it has commonly been the practice to add small quantities of certain materials to the glycol to inhibit its corrosive tendencies, to suppress foaming and to prevent leakage or seepage through small capillary openings in the system in which it is circulated. The efficacy of these additives to accomplish their intended ends has not been entirely satisfactory. In the case of some of these additives, such as borax, which is used as a corrosion inhibitor, the beneficial effect of the addition is somewhat depreciated because the additive tends to cause or increase the tendency of the glycol to foam. Since the propensity of most aqueous glycol formulations which contain no additive whatsoever to foam constitutes a serious problem in cooling systems and other environments in which this material is used, the further promotion of any foam formation by the use of certain types of additives which are directed to other functions than foam suppression greatly intensifies the problems which foaming presents. In addition, in many instances, the walls of the cooling system, hydraulic line, etc., in which the glycolic composition circulates will contain deposits of some type which increase foaming of the glycolic material. Moreover, if the rate of circulation or agitation of the glycol containing liquid in its confining system is great, large amounts of air are entrained in the glycolic material tending to further aggravate the foaming problem. Serious losses of the glycol formulation from the system may result, and additionally, the effectiveness of the glycol as a freezing point depressant, where it is so used, is seriously impaired by excessive foaming.

It is desired to briefly explain the various conditions under which glycols tend to foam and thereby explain why many glycols foam but then again why all do not. First of all, as those skilled in the art undoubtedly are aware, there is a difference in degree of foaming between glycols obtained from different manufacturers. This difference is readily explained by one of, or a combination of, several possible factors. Since polyglycols are foam inhibitors, and are usually formed as by-products in the preparation of glycols, the small amounts which remain in the glycol product, either intentionally or unintentionally, reduce the foaming tendency proportionately. Other impurities which are introduced by the process and remain in the product can and do cause or increase foaming of the glycol in spite of the fact that the glycol may or may not also contain small amounts of, and thus at least partially effective, foam inhibitors as an inherent part of the particular process of preparing the glycol. It is thus contemplated that the antifoam agents of this invention can and will be advantageously employed to retard or reduce foaming with glycol base fluids having foam promoting substances therein either intentionally or unintentionally introduced and/or foam retarding substances present intentionally or unintentionally introduced but especially where such foam retarding substances are not completely effective in inhibiting foam of the glycol base fluid or aqueous solutions thereof.

Numerous materials have been heretofore tested and utilized as foam inhibiting additives to glycolic formulations, particularly, the formulations used as freezing point depressants in aqueous heat exchange systems. In some instances, these foam inhibiting materials have been insoluble, or only partially soluble, in the glycols constituting the major ingredient of the glycolic base material. Such insolubility, resulting in a two phase system in the glycol concentrate, has the obvious disadvantage of making the total transfer of the foam inhibited formulation to the cooling or circulatory system difficult. Foam inhibitors of this type include esters of the higher saturated or unsaturated fatty acids. More recently, materials which are substantially more soluble in the glycol formulations have been used. Examples of foam inhibitors of this more soluble type are certain higher molecular weight, saturated, secondary, branch-chain alcohols, such as those disclosed in U.S. Patent 2,264,362 issued to Leo J. Clapsadle, and also a number of specific, primary, straight chain aliphatic alcohols of eleven carbon atoms or less which are described in U.S. Patent 2,721,183. In some instances, glycol soluble, relatively active foam inhibitors are characterized by the undesirable property of high volatility so that they are rapidly vaporized and lost from the system in which they are being circulated. An example of this type of foam inhibitor is the relatively low molecular weight ethers. In some other types of anti-foamants, the materials are incompatible with other additives, such as silicate type corrosion inhibitors.

The fact that none of the foregoing types of anti-foamants has provided an entirely satisfactory solution of the foaming problem is evidenced by the large number of other materials which have some particular property to recommend them, and which are being currently used to varying extents in glycol base formulations primarily as foam inhibitors. A partial, and by no means exhaustive, listing of these compounds would include tricresyl phosphate (see U.S. Patent 2,777,821), various polysilicone compounds, relatively non-volatile petroleum fractions, tributyl phosphate, so-called LOROL alcohols, trihydroxy polyoxyalkylene ethers of glycerol (U.S. Patent 2,948,-757), aliphatic ethers of from eleven to eighteen carbon atoms per molecule (U.S. Patent 2,902,452), tributyl citrate, calcium acetate, certain complex hydrocarbon mixtures sold under the trademark "Tagols," butyl phthalate, nonyl phenol, propylene glycol esters prepared by a transesterification process from soybean and castor oils, alkyl phosphates, aryl phosphates, kerosene, and fatty acid soaps.

The present invention now adds a new foam inhibiting material to this active and highly developed field. A major object of the invention is to provide a novel foam inhibiting material which is soluble in the usual glycol base formulations, which is compatible with the types of additives normally used in such formulations and which provides a foam suppressing action which is better in at least one respect than the best foam inhibiting agents known or now being marketed for this purpose.

Another object of the present invention is to provide a method for inhibiting the formation of foam in cooling systems which rely upon a glycolic compound as the major component for freezing point depressing purposes.

An additional object of the present invention is to provide a foam inhibiting additive for glycol base anti-freezes, which additive, in addition to its foam inhibiting properties, also functions as a leak inhibitor.

A further object of the present invention is to provide a foam inhibiting additive for glycol base anti-freeze formulations, which additive effectively suppresses the foaming tendencies of such formulations over a wide range of concentrations in which the additive may be added to the glycol formulation.

An additional object of the present invention is to provide a foam inhibiting additive for use in glycol formulations, which additive effectively reduces the stability of the small amount of foam which can form in the presence of the inhibitor, thus reducing the time required for such foam to break up.

In addition to the foregoing objects and advantages of the present invention, other advantages will become manifest upon a reading of the following detailed description of the invention.

The foam inhibiting material which is proposed by the present invention is a saturated, aliphatic, branched-chain, primary alcohol containing between 14 and 22 carbon atoms, or a mixture of such alcohols. These alcohols are preferably obtained by the well-known Oxo process in which hydrogen and carbon monoxide are contacted with olefinic hydrocarbons in the presence of a suitable catalyst to form the corresponding aldehydes and through subsequent and some in situ hydrogenation the corresponding alcohols. Within this general classification, the preferred alcohols are the branched-chain $C_{16}$ to $C_{20}$ primary alcohols especially wherein the length of the side chain is only slightly less than the length of the main or longest chain. Methyl substituted 2-hexyl-1-decanols are the foam inhibiting agents which are most preferred. Suitable compounds may be represented by the structural formula:

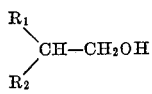

where $R_1$ and $R_2$ are alkyl radicals which contain a total of 12 to 20 carbon atoms and wherein each of said alkyl radicals contains at least 4 carbon atoms. Preferably $R_1$ and $R_2$ are alkyl radicals which contain a total of 14 to 18 carbons and each of $R_1$ and $R_2$ contains at least 6 carbons. The reasons for the particular carbon content and structure set forth is the necessary prerequisite of sufficient solubility in glycol (especially ethylene glycol) to enable the effective amounts of the anti-foam alcohol to be dissolved in the glycol and thus the glycol antifreeze concentrate. Another factor closely associated with carbon content, structure and solubility in glycol of the alcohols is the physical state at normal ambient temperatures. At normal ambient temperatures (about 20° C.) the antifoam alcohol is preferably a liquid since handling and blending will be simplified if the antifoamer is a liquid at such condition.

A mixture of isomers having the general structural formula set forth above may also be effectively used as a foam inhibiting additive in glycol formulations. One such mixture of isomers prepared by the Oxo process, at this writing is marketed commercially, and is a mixture of methyl substituted 2-hexyl decanols characterized by properties closely approximating the following:

Purity, wt. percent _____ 98
Hydroxyl No., mg. KOH/g. _____ 228
Specific gravity 20/20° C. _____ 0.8443
Refractive index, N20/D _____ 1.4513
Freezing point, ° F. _____ −60
Boiling range, ° C./50 mm. _____ 195–203
Pour point, ° F. _____ −75
Flash point (open cup), ° F. _____ 275

Other specific illustrative examples of suitable alcohols which have the general formula and properties set forth above are:

2-pentyl-1-nonanol
2-butyl-1-decanol
2-hexyl-1-octanol
4-butyl-1-undecanol
2-(2-ethyl pentyl)-1-octanol
2-isopentyl-1-undecanol
3-isobutyl-1-dodecanol
2-(2-ethyl butyl)-1-decanol
2-heptyl-1-nonanol
2-hexyl-1-decanol
2-(2-ethyl butyl)-1-undecanol
3-heptyl-1-decanol
2-(3-ethyl pentyl)-1-undecanol
2-pentyl-7-butyl-1-nonanol
2-hexyl-1-dodecanol
5-(3-ethyl pentyl)-1-dodecanol
2-isoheptyl-1-dodecanol
2-isopentyl-4-propyl-1-dodecanol
3-isoheptyl-1-tridecanol
2-octyl-1-decanol
6-butyl-1-hexadecanol
4-butyl-1-heptadecanol
2-(2-ethyl pentyl)-1-tetradecanol
5-isobutyl-1-octadecanol
3-butyl-6-propyl-1-pentadecanol
4-pentyl-7-ethyl-1-pentadecanol The most preferred anti-foaming alcohols of the invention have been found to be very effective foam suppressants in concentrations as low as about 0.01% by weight, based on the weight of ethylene glycol in a concentrated aqueous glycol solution (about 95 parts by weight glycol and 5 parts by weight of additives and water). Some further improvement in foam inhibition is realized when 0.05% by weight of the additive is utilized. It is not intended, however, to limit the range of effective concentrations in which the high molecular weight, branched-chain, primary alcohols of the invention may be used to between 0.01% and 0.05% by weight, since the foam inhibiting function of the additive is manifested at considerably higher and lower concentrations, and the optimum concentration to be used will in each case be determined by a variety of factors, such as the contemplated use of the glycol, other additives which are to be used, the pH of the final formulation, the temperature during ultimate use, and not the least important, the particular type and composition of glycol which is to be used. Such being the case, a sufficient amount of antifoam agent must be employed to effectively inhibit foam in the particular glycol or formulation desired to be so inhibited. The specific effective amount being determined by routine tests facilitated by the discussion as found herein. The amount so determined would be and we shall refer to as an antifoam or a foam inhibiting amount of the alcohol. On the other hand, an amount of the antifoam alcohol in excess of its solubility preferably should not be employed since it will form a second phase in the concentrate. In some cases at least part of the alcohol may phase out when the glycol or antifreeze concentrate is added to large amounts of water to form aqueous solutions thereof such as when added to an automobile's cooling system. This is of no concern, however, it is desirable that the alcohol be dissolved in a glycol or antifreeze concentrate during interim storage or handling (especially by the consumer, distributor or the like), and not necessarily in an aqueous solution which is the usual way in which it is actually employed. Amounts in excess of the solubility, however, can be used if it is desired to use such larger amounts. The foam suppressing properties of the alcohols at the 0.01% to 0.05% concentrations are sufficient that such an amount will normally be employed in an anti-free concentrate since tests conducted employing these concentrations in the concentrate clearly show that the inhibitor of this invention is superior to other known foam inhibitors.

The results of comparative tests of the foam inhibiting agent of the present invention with a number of commercially available foam inhibitors are tabulated in Table I below. In the performance test, 100 ml. of the glycol formulation (a concentrated premix) containing the foam inhibitor, and 100 ml. of distilled water were placed in a 1000 ml. graduated cylinder which was positioned in a controlled temperature water bath (60° C.) A diffuser stone was then immersed in the aqueous glycol solution with an air source connected thereto. The height of the solution in the cylinder was then read. Next, clean dry air was bubbled through the solution from the diffuser stone at 4000 ml. per minute and the flow maintained for 5 minutes ±30 seconds. The height of the foam which was formed over the solution was then immediately recorded and the height was taken as a measure of the effectiveness of the foam inhibiting agent which had been added to the glycol formulation. In Table I, a number of foam inhibitors and many of which are now commonly used in commercial antifreezes are compared, as they are effective in various concentrations, and in various glycols, with the higher molecular weight, saturated, branched-chain, aliphatic primary alcohol inhibitors of the present invention.

tives previously in use which can be employed without the disadvantages of a second phase in the concentrate and is as good as those inhibitor types previously employed wherein a disadvantageous second phase in the concentrate is experienced with their use. The improvement demonstrated by the alcoholic inhibitors of the present invention over the secondary heptadecanols and Lorol alcohols which have previously been utilized, though not extreme, was significant and quite surprising in view of the common factor of alcohol functional groups in all of these materials. Moreover, the solubility of the inhibitor in the glycol concentrate (prior to the addition of large amounts of water) is such that a stable, singe phase concentrate system is achieved.

In addition to their effectiveness as foam inhibiting agents, the alcohols of the present invention unexpectedly possess valuable antiseep properties and thereby provide a further unexpected technological bonus through their use. Frequently, for example, the cooling systems of internal combustion engines in which glycol freezing point depressants are employed will, over extended periods of operation, develop tiny pinpoint holes in the walls of the heat exchange conduits and radiators. It is therefore customary to add to the antifreeze some type of material having the ability to form a protective coating over these tiny apertures in order to prevent the loss of the antifreeze through leakage. The antiseep properties of a material are usually evaluated by testing a glycol blend containing the material in a capillary rise apparatus. A low capillary rise, usually in the range of 2 to 3 centimers, is considered an indication that the material has significant

TABLE I

| Foam Inhibitor Additive | Concentration in Antifreeze Concentrate, Weight Percent | Glycol Formulated | Foam Test Using 50%-50% Blend Antifreeze Concentrate-Water | |
|---|---|---|---|---|
| | | | Foam Height, mls. | Break Time, Sec. |
| 1. Base Glycol (no additives) | | A | 540 | 11 |
| 2. Base Glycol (no additives) | | B | 230 | 4 |
| 3. Concentrated Antifreeze Base (no foam inhibitor) | | A | 1,000+ | 15 |
| 4. Polyglycol | [1] 0.01 | B | 65 | 2 |
| 5. Polyglycol | [1] 0.05 | A | 400 | 7 |
| 6. Butyl phthlate | 0.01 | A | 1,000+ | |
| 7. Tributyl phosphate | 0.03 | A | 1,000+ | |
| 8. Tricresyl phosphate | 0.03 | A | 190 | 3 |
| 9. Hexyl ether | 0.05 | A | 570 | 11 |
| 10. Neopentyl glycol | 0.02 | B | 155 | 3 |
| 11. 2-ethyl hexanol | 0.1 | A | 1,000+ | |
| 12. 2-ethyl hexanol | 0.1 | B | 535 | 10 |
| 13. 2-propyl-1-heptanol | 0.01 | A | 1,000+ | |
| 14. 2-propyl-1-heptanol | 0.05 | B | 565 | 14 |
| 15. Trimethyl nonanol | 0.02 | A | 630 | 8 |
| 16. Trimethyl nonanol | 0.05 | A | 610 | 9 |
| 17. 2,2-dimethyl octanol | 0.01 | A | 560 | 10 |
| 18. 2,2-dimethyl octanol | 0.05 | A | 710 | 18 |
| 19. 1-methylcyclohexane | 0.02 | B | 245 | 7 |
| 20. Lorol Alcohols [2] | 0.01 | A | 190 | 3 |
| 21. Lorol Alcohols [2] | 0.03 | A | 190 | 3 |
| 22. Lorol Alcohols [2] | 0.05 | A | 120 | 2 |
| 23. Lorol Alcohols [2] | 0.10 | A | 70 | 1 |
| 24. Secondary heptadecanol | 0.05 | A | 90 | 2 |
| 25. Secondary heptadecanol | 0.01 | A | 90 | 3 |
| 26. Secondary heptadecanol | 0.05 | B | 50 | 2 |
| 27. 2-hexyl-1-decanols | 0.01 | A | 90 | 2 |
| 28. 2-hexyl-1-decanols | 0.02 | A | 70 | 2 |
| 29. 2-hexyl-1-decanols | 0.05 | A | 50 | 1 |
| 30. 2-hexyl-1-decanols | 0.05 | B | 65 | 1 |
| 31. 2-hexyl-1-decanols | 0.01 | C | 120 | 3 |
| 32. 2-hexyl-1-decanols | 0.02 | C | 70 | 2 |
| 33. 2-hexyl-1-decanols | 0.05 | C | 60 | 1 |

[1] A two phase composition.
[2] Trademark of E. I. Dupont de Nemours Co. for a mixture of straight chain, even numbered alcohols where the dodecyl predominates and prepared by hydrogenation of coconut oils.

All of the above antifoam test runs (3 through 33) were in formulations containing the corrosion inhibiting additives of my co-pending application originally filed on March 7, 1960 as Serial No. 12,914 and refiled on May 28, 1962, as Serial No. 197,876, and said corrosion inhibitor system is also discussed hereinafter.

Glycols A, B and C are merely three different commercial glycols with different foam properties used in the formulation for illustrative and comparative purposes. (See for example entries 1 and 2 which show the foam tendencies of glycols A and B without any additives.)

The ability of the inhibitors of the present invention to suppress foaming in glycol formulations is indicated clearly by Table I to be better than foam inhibiting additives previously in use which can be employed without speed or leak inhibiting characteristics. Table II displays the capillary rise data obtained in tests of the alcohols of the present invention when blended in varying concentrations with a glycol base. The concentrations of the additive as expressed in percent by weight, based on the weight of the glycol.

TABLE II

| Material: | Capillary rise, cm. |
|---|---|
| Base glycol | 3.59 |
| Glycol+0.01% 2-hexyl-1-decanol | 2.54 |
| Glycol+0.02% 2-hexyl-1-decanol | 2.57 |
| Glycol+0.05% 2-hexyl-1-decanol | 2.44 |

As has been previously indicated, the foam inhibiting compounds of the present invention may be added to substantially all types of glycol base formulations now used as a freezing point depressant or in any of the other ways hereinbefore described. This is due to its compatibility with all of the various types of additive materials which are or can be used in such formulation. As examples of some of these additives, one may cite as exemplary of corrosion inhibiting additives, sodium nitrite, dipotassium phosphate, alkali metal arsenite, dibasic alkali metal arsenates, alkali metal tetraborates, alkali metal metaborates, sodium metasilicate, water glass silicates, sodium orthosilicate, mercaptobenzothiazole and sodium mercaptothiazole. Examples of antiseep or leak inhibiting additives are light mineral oils or petroleum fractions, such as that sold under the trade name Indoil No. 12, alginate compounds, hydrozyalkyl cellulose derivatives and organic phosphates. An additional additive to the glycol base material may frequently be an appropriate dye such as Calcozine Red BX, Alizarine Red GWN, Alizarine Cyanone Green, Methyl Violet 2B, Rhodamine B, Sudan Blue and Quinoline Yellow. The presence of any or all of the foregoing materials does not detrimentally affect the foam inhibiting compounds of the present invention when they are added to the glycol formulation, nor does the addition of the high molecular weight, saturated, aliphatic, branched-chain primary alcohols of this invention result in precipitation or any other adverse effect on these additives inclusive of their respective functions.

Usually corrosion inhibitor systems employed contain an alkaline earth metal borate, an alkali metal borate (either the tetraborate or metaborate or a mixture of the two), an alkali metal silicate (usually the metasilicate), and mercaptobenzothiazole or an alkali metal salt of mercaptobenzothiazole (usually the latter since the salt will form in situ if sodium ions are available), alkali metal arsenites, alkali metal arsenates, alkali metal nitrites, alkali metal nitrates, alkali metal phosphates, various amines especially the commercial corrosion inhibitor amines such as triethanolamine and adducts of Rosin Amine D with ethylene oxide, but others are also suitable; and more usually the inhibitor systems comprise mixtures of at least two of the foregoing components. Such systems which are sufficiently soluble in the antifreeze concentrate are suitable in this invention. Specific illustrative examples of some such contemplated and/or tested as suitable in this invention are:

| | Ingredients | Approximate Amounts in the Concentrate (Percent by Weight or Parts Based on 100 Parts) |
|---|---|---|
| (1) | Glycol (preferably ethylene glycol)<br>Sodium metaborate<br>Sodium mercaptobenzothiazole<br>Water | About 95.<br>About 1 to 3.<br>About 0.005 to 0.5.<br>About 2. |
| (2) | Glycol (preferably ethylene glycol)<br>Calcium borate<br>Sodium mercaptobenzothiazole<br>Water | About 95.<br>About 1 to 3.<br>About 0.005 to 0.5.<br>About 2. |
| (3) | Glycol (preferably ethylene glycol)<br>Sodium metaborate<br>Sodium mercaptobenzothiazole<br>Sodium arsenite<br>Water | About 95.<br>About 1 to 3.<br>About 0.1 to 0.2.<br>About 0.2 to 0.5.<br>About 2.<br>(See also U.S. Patent No. 2,960,473). |
| (4) | Glycol (preferably ethylene glycol)<br>Sodium borate<br>Sodium metasilicate<br>Sodium nitrate<br>Sodium nitrite<br>Sodium mercaptobenzothiazole<br>Water | These ingredients are preferbaly to be used in amounts and proportions set forth in U.S. Patent No. 2,815,328. |
| (5) | Glycol (preferably ethylene glycol)<br>Sodium borate<br>Sodium metasilicate<br>Sodium nitrite<br>Sodium mercaptobenzothiazole<br>Water | These ingredients are preferably to be used in amounts and proportions set forth in U.S. Patent No. 2,972,581. |

The water employed with any of the above antifreeze concentrates or the aqueous solutions thereof as the heat exchange fluid may be distilled water, ionized water, other degrees of purified water and tap water with varying degrees of corrosion experienced as the result thereof.

One highly, and in fact most preferred formulation is that numbered (3) above and an especially preferred embodiment of same is where the sodium borate is mostly in the metaborate form and the corresponding potassium salts of one or more of the ingredients is employed for part or all of the sodium salt shown.

Another preferred antifreeze formulation in which may be incorporated the foam inhibiting additives of the present invention is that which is described in applicant's co-pending application for United States Letters Patent Serial No. 12,914 filed on March 7, 1960, and refiled on May 28, 1962 and received Serial No. 197,876, now U.S. Patent 3,282,846. In said co-pending application, certain highly effective corrosion inhibiting additives, in addition to organic phosphate type leak inhibiting compounds are described, along with the optimum proportions in which they may be incorporated in a glycol base antifreeze. It is intended that any and all of the teachings and disclosures set forth in said application be incorporated by reference in the present application, and a preferred antifreeze formulation includes the corrosion but not necessarily (note: preferably and advantageously not) the seep inhibiting agents of the co-pending application (the latter are not necessary with the present foam inhibitor since it performs a dual function of seep and foam inhibition as previously indicated), as well as the foam inhibiting additives of the present invention and such a formulation is described hereinafter. It is to be understood that, although the formulation including these materials constitutes a preferred and highly effective antifreeze formulation for use in the cooling systems of internal combustion engines, it is not intended that the present invention be limited to such formulations inasmuch as widely varying proportions of the hereinafter described additives can be utilized in various formulations with the antifoam additives of this invention.

The relative quantities in parts by weight of all of the important components of such a premixed glycol concentrate are set forth for convenience in a tabular form as follows:

| Ingredients | Approximate Amount in the Concentrate (percent by Weight or Parts Based on 100 Parts) |
| --- | --- |
| Methyl substituted 2-hexyl-1-decanol | About 0.005 to 0.5. |
| Sodium tetraborate (in the pentahydrate form). | About 2 to about 3. |
| Sodium metasilicate (in the pentahydrate form). | About 0.01 to about 0.3. |
| Sodium mercaptobenzothiazole | About 0.005 to about 0.5. |
| Water (total from all sources) | About 1.0 to about 5.0. |
| Ethylene glycol (containing other glycols). | About 95. |

In the above tabulations of ranges of ingredients, it is to be understood that the ranges given relate, where given, to the exact form of compounds employed; but the particular form of the compound, where given, is merely illustrative. For example, sodium tetraborate pentahydrate is given in a particular range above. However, this is not meant to limit any of the formulations to a particular hydrate or borate, since either borate (and usually a mixture of the two) or another hydrate form can be used in all of the above formulations. In such cases, however, the quantity of the different salt or the hydrate form would be different from the quantity set forth. The desired amount of a particular salt form, where not given, can be readily determined by routine tests within or overlapping the ranges set forth. The equivalent amount of the hydrates can, by calculation, be readily determined by those skilled in the art. Finally, it is also to be understood that the sodium mercaptobenzothiazole and the sodium metaborate can be prepared in situ from sodium hydroxide and mercaptobenzothiazole or sodium tetraborate, respectively.

With respect to the glycol concentration, it is well known that any quantity of the glycol is operable. However, the effect of lowering the freeze point of water in a cooling system in which the antifreeze formulation is utilized is one of degree varying directly with the quantity of glycol which is added to the system, and thus the glycol is to be kept at a maximum in the concentrate composition. In the latter connection, it goes without saying that the composition described hereinbefore is a glycol concentrate which in practice is added to the water in a cooling system in a quantity which is sufficient to lower the freezing point of the final solution to a specific desired temperature. There is, therefore, actually no limitation on the amount of water which the composition may contain, just as there is no minimum on how much glycol must be present in order for the formulation to function effectively in its ultimate use.

Having now described in detail certain preferred embodiments of the present invention, it is to be pointed out that I recognize and expect that a number of variations and modifications in the particular concentrations described, as well as in the particular constituents of the glycol formulations hereinbefore mentioned will occur to, and be practiced by, those skilled in the art. Nevertheless, insofar as any preparations or formulations of glycol base compositions rely upon the incorporation of foam inhibiting compounds of the type herein described, such formulations are deemed to utilize the present invention and to fall within the purview of the appended claims.

The invention having thus been described, what is claimed and desired to be secured by Letters Patent is:

1. A composition consisting essentially of a glycol of 2 to 4 carbon atoms and a foam inhibiting amount of an aliphatic, saturated, branched-chain primary alcohol containing at least 14 and not more than 22 carbon atoms in the molecule as a foam inhibiting agent for said composition.

2. The composition of claim 1 wherein said primary alcohol has the structural formula

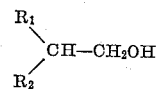

in which $R_1$ and $R_2$ are alkyl radicals which contain a total of 12 to 20 carbon atoms and in which each of said alkyl radicals contains at least 4 carbon atoms.

3. The composition of claim 2 wherein said alkyl radicals contain a total of 14 to 18 carbon atoms and wherein each of said alkyl radicals contains at least 6 carbon atoms.

4. A single-phase antifreeze composition which consists essentially of, in combination, ethylene glycol and a saturated, aliphatic branched-chain, primary alcohol containing from 14 to 22 carbon atoms in the molecule in an amount of between about 0.01% and about 0.05% by weight, based upon the weight of the glycol.

5. An inhibited, single-phase antifreeze composition which consists essentially of a major amount of ethylene glycol and a minor amount of an additive consisting essentially of, on a weight basis, a sodium tetraborate in an amount equivalent to about 2.0 to about 3.0 parts of sodium tetraborate pentahydrate, a sodium metasilicate in an amount equivalent to about 0.01 to about 0.3 parts of sodium metasilicate pentahydrate, about 0.005 to about 0.5 parts of sodium mercaptobenzothiazole, at least about three times as many parts of water, including water of hydration, as the silicate, and about 0.01 to 0.05 parts by weight of an aliphatic, saturated, branched-chain primary alcohol of 14 to 22 carbon atoms.

6. The composition of claim 5 wherein the aliphatic, saturated, branched-chain primary alcohol is a mixture of isomers of methyl substituted 2-hexyl-1-decanols prepared by the Oxo process and having approximately the following properties:

| | |
| --- | --- |
| Purity, wt. percent | 98 |
| Hydroxyl No., mg. KOH/g. | 228 |
| Specific gravity 20/20° C. | 0.8443 |
| Refractive index, N20/D | 1.4513 |
| Freezing point, ° F. | −60 |
| Boiling range, ° C./50 mm. | 195–203 |
| Pour point, ° F. | −75 |
| Flash point (open cup), ° F. | 275 |

7. A single-phase antifreeze composition which consists essentially of a major amount of ethylene glycol and a minor amount of an additive consisting essentially of, on a weight basis, sodium borate in an amount equivalent to about 1 to 3 parts of sodium metaborate, about 0.2 to 0.5 parts of sodium arsenite, about 0.1 to 0.2 parts of sodium mercaptobenzothiazole, about 2.0 parts of water and about 0.01 to 0.05 parts by weight based on said glycol of an aliphatic, saturated, branched-chain primary alcohol of 14 to 22 carbon atoms.

8. The composition of claim 7 wherein the aliphatic, saturated, branched-chain primary alcohol is a mixture of isomers of methyl substituted 2-hexyl-1-decanols prepared by the Oxo process and having approximately the following properties:

| | |
| --- | --- |
| Purity, wt. percent | 98 |
| Hydroxyl No., mg. KOH/g. | 228 |
| Specific gravity 20/20° C. | 0.8443 |
| Refractive index, N20/D | 1.4513 |
| Freezing point, ° F. | −60 |
| Boiling range, ° C./50 mm. | 195–203 |
| Pour point, ° F. | −75 |
| Flash point (open cup), ° F. | 275 |

9. A method of inhibiting foaming of compositions consisting essentially of a glycol of 2 to 4 carbon atoms which method comprises adding to said glycol a foam-inhibiting amount of a branched-chain, saturated, aliphatic, primary alcohol of 14 to 22 carbon atoms.

10. A method of inhibiting foaming of a composition consisting essentially of ethylene glycol which method comprises adding to said glycol about 0.01 to 0.05% by weight based on the glycol of a branched-chain, saturated, aliphatic, primary alcohol of the general formula

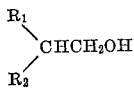

wherein $R_1$ and $R_2$ are alkyl radicals which contain a total of 14 to 18 carbon atoms and wherein each of said alkyl radicals contains at least 6 carbon atoms.

11. A method of inhibiting foaming of compositions consisting essentially of ethylene glycol which method comprises adding to said glycol a foam-inhibiting amount of a mixture of isomers of methyl substituted 2-hexyl-1-decanols prepared by the Oxo process and having approximately the following properties:

| | |
|---|---|
| Purity, wt. percent | 98 |
| Hydroxyl No., mg. KOH/g. | 228 |
| Specific gravity 20/20° C. | 0.8443 |
| Refractive index, N20/D | 1.4513 |
| Freezing point, ° F. | −60 |
| Boiling range, ° C./50 mm. | 195–203 |
| Pour point, ° F. | −75 |
| Flash point (open cup), ° F. | 275 |

12. A corrosion inhibiting, foam suppressing additive composition for use in glycolic base antifreeze compositions wherein said glycol has 2 to 4 carbon atoms which consists essentially of:
  (a) about 2 to about 3 parts sodium borate
  (b) about 0.01 to about 0.3 parts sodium metasilicate
  (c) about 0.005 to about 0.5 parts sodium mercaptobenzothiazole
  (d) about 0.01 to about 0.05 percent of a saturated, aliphatic, branched-chain primary alcohol containing at least 14 and not more than 22 carbon atoms in the molecule.

13. A corrosion inhibiting, foam suppressing additive composition for use in glycolic base antifreeze compositions wherein said glycol has 2 to 4 carbon atoms which consists essentially of:
  (a) about 1 to about 3 parts sodium borate
  (b) about 0.1 to about 0.2 parts sodium arsenite
  (c) about 0.2 to about 0.5 parts sodium mercaptobenzothiazole
  (d) about 0.01 to about 0.05 pecent of a saturated, aliphatic, branched-chain primary alcohol containing at least 14 and not more than 22 carbon atoms in the molecule.

14. A method of simultaneously suppressing foaming and seepage of a composition consisting essentially of a glycol of 2 to 4 carbon atoms which method comprises adding from about 0.01 to about 0.05 percent of a branched-chain, saturated, aliphatic, primary alcohol of 14 to 22 carbon atoms.

15. A method of simultaneously suppressing foam and seepage of a composition consisting essentially of a glycol of 2 to 4 carbon atoms which method comprises adding from about 0.01 to about 0.05 percent of a branched-chain, saturated, aliphatic, primary alcohol of the general formula

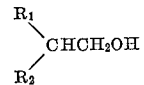

wherein $R_1$ and $R_2$ are alkyl radicals which contain a total of 14 to 18 carbon atoms and wherein each of said alkyl radicals contains at least 6 carbon atoms.

16. A method of simultaneously suppressing foam and seepage of a composition consisting essentially of a glycol of 2 to 4 carbon atoms which method comprises adding from about 0.01 to about 0.05 percent of a branched-chain, saturated, aliphatic, primary alcohol consisting essentially of a mixture of isomers of methyl substituted 2-hexyl-1-decanols prepared by the Oxo process and having approximately the following properties:

| | |
|---|---|
| Purity, wt. percent | 98 |
| Hydroxyl No., mg. KOH/g. | 228 |
| Specific gravity 20/20° C. | 0.8443 |
| Refractive index, N20/D | 1.4513 |
| Freezing point, ° F. | −60 |
| Boiling range, ° C./50 mm. | 195–203 |
| Pour point, ° F. | −75 |
| Flash point (open cup), ° F. | 275 |

17. The method of inhibiting foaming of the glycol base coolant circulating through the cooling system of an internal combustion engine wherein said glycol has from 2 to 4 carbon atoms which comprises adding to said circulating coolant, from about 0.01% to about 0.05% by weight, based on the weight of the glycol in the coolant, of a saturated, aliphatic, branched-chain primary alcohol containing 14 to 22 carbon atoms in the molecule.

18. A composition consisting essentially of a glycol of 2 to 4 carbon atoms, sodium borate, sodium mercaptobenzothiazole, and a branched-chain, saturated, aliphatic, primary alcohol of 14 to 22 carbon atoms.

References Cited

UNITED STATES PATENTS

| | | | |
|---|---|---|---|
| 2,264,362 | 12/1941 | Clapsadle | 252—72 |
| 2,457,866 | 1/1949 | Carter | 260—642 |
| 2,815,328 | 12/1957 | Green et al. | 252—75 |
| 2,960,473 | 11/1960 | Meighen et al. | 252—75 |

OTHER REFERENCES

Ross, Chemical Antifoaming Agents, Chemical Industries, May 1949; pp. 757–8 relied on.

LEON D. ROSDOL, *Primary Examiner.*

JULIUS GREENWALD, *Examiner.*

J. D. WELSH, *Assistant Examiner.*